United States Patent
Xie et al.

(10) Patent No.: US 7,607,082 B2
(45) Date of Patent: Oct. 20, 2009

(54) CATEGORIZING PAGE BLOCK FUNCTIONALITY TO IMPROVE DOCUMENT LAYOUT FOR BROWSING

(75) Inventors: Xing Xie, Beijing (CN); Gengxin Miao, Beijing (CN); Guomao Xin, Beijing (CN); Ruihua Song, Beijing (CN); Ji-Rong Wen, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 11/235,430

(22) Filed: Sep. 26, 2005

(65) Prior Publication Data
US 2007/0074108 A1 Mar. 29, 2007

(51) Int. Cl.
*G06F 17/00* (2006.01)
(52) U.S. Cl. .................. 715/246; 715/253
(58) Field of Classification Search ............... 715/243, 715/246, 252, 253, 234, 247
See application file for complete search history.

(56) References Cited

U.S. PATENT DOCUMENTS

| | | | |
|---|---|---|---|
| 5,848,184 A | 12/1998 | Taylor et al. | |
| 6,026,409 A | 2/2000 | Blumenthal | |
| 6,088,710 A * | 7/2000 | Dreyer et al. | 715/246 |
| 6,345,279 B1 | 2/2002 | Li et al. | |
| 6,970,602 B1 | 11/2005 | Smith et al. | |
| 7,131,063 B2 * | 10/2006 | Mateos | 715/205 |
| 7,322,007 B2 * | 1/2008 | Schowtka et al. | 715/243 |
| 7,401,079 B2 * | 7/2008 | Itoh et al. | 707/7 |
| 2001/0034740 A1 * | 10/2001 | Kerne | 707/500.1 |
| 2002/0029246 A1 | 3/2002 | Kumagai | |
| 2002/0083096 A1 | 6/2002 | Hsu et al. | |
| 2002/0156807 A1 * | 10/2002 | Dieberger | 707/501.1 |
| 2003/0101412 A1 * | 5/2003 | Eid | 715/513 |
| 2004/0146199 A1 | 7/2004 | Berkner et al. | |
| 2004/0237030 A1 * | 11/2004 | Malkin | 715/505 |
| 2005/0125725 A1 * | 6/2005 | Gatt | 715/517 |
| 2005/0289133 A1 | 12/2005 | Arrouye et al. | |
| 2006/0031202 A1 * | 2/2006 | Chang et al. | 707/3 |
| 2006/0107205 A1 * | 5/2006 | Makela | 715/520 |
| 2006/0150094 A1 * | 7/2006 | Patrawala | 715/520 |

OTHER PUBLICATIONS

Rekimoto, Jun, et al, "DataTiles: A Modular Platform for Mixed Physical and Graphical Interactions", CHI '01: Proceedings of the SIGCHI Conference on Human Factors in Computing Systems, Mar. 2001, pp. 269-276.*

Bjork, et al., "West: A Web Browser for Small Terminals", pp. 77-103.

Buyukkoten, et al., "Accordion Summarization for End-Game Browsing on PDAs and Cellular Phones", ACM, vol. 3, No. 1, 2001, pp. 213-220.

(Continued)

*Primary Examiner*—Laurie Ries
(74) *Attorney, Agent, or Firm*—Lee & Hayes, PLLC (57) ABSTRACT

Categorizing page block functionality to improve document layout for browsing is described. In one aspect, document content is analyzed with respect to multiple block function criteria. Results of this analysis are used to assign a respective block function to blocks of the document content. These block function assignments are used to generate one or more customized document layouts for browsing by a user.

18 Claims, 7 Drawing Sheets

OTHER PUBLICATIONS

Ma, Qiang et al. "A Localness-Filter for Searched Web Pages", 12 pages.
Chen, Yu et al. "Adapting Web Pages for Small-Screen Devices", IEEE Internet Computing, Jan.-Feb. 2005, 7 pages.
Xie, Xing et al. "An adaptive web page layout structure for small devices", Multimedia Systems 2005, 11 pages.
Gravano, Luis et al. "Categorizing Web Queries According to Geographical Locality", CIKM 2003, 9 pages.
Wang, Lee et al. "Dectecting Dominant Locations from Search Queries", SIGIR 2005, 8 pages.
Lin, Shian-Hua et al. "Discovering Informative Content Blocks from Web Documents", SIGKDD 2002, 6 pages.
Gupta, Suhit et al. "DOM-based Content Extraction of HTML Documents", 10 pages.
Yi, Lan et al. "Eliminating Noisy Information in Web Pages for Data Mining", SIGKDD 2003, 10 pages.
Buyukkokten, Orkut et al. "Focused Web Searching with PDAs", 20 pages.
Chen, Jinlin et al. "Function-based Object Model Towards Website Adaptation", 21 pages.
Song, Ruihua et al. "Learning Block Importance Models for Web Pages", May 2004, 9 pages.
Buyukkokten, Orkut et al. "Power Browser: Efficient Web Browsing for PDAs" 8 pages.
Wen, Ji-Rong et al. "Probabilistic Model for Contextual Retrieval", Jul. 2004, 7 pages.
Kovacevic, Milos et al. "Recognition of Common Areas in a Web Page Using Visual Information: a possible application in a page classification", 8 pages.
Milic-Frayling, Natasa et al. "SearchMobil: Web Viewing and Search for Mobile Devices", May 2003, 8 pages.
Jones, Matt et al. "Sorting out Searching on Small Screen Devices", 15 pages.
Yin, Xinyi et al. "Understanding the Function of Web Elements for Mobile Content Delivery Using Random Walk Models", May 2005, 2 pages.
Jones, Matt et al. "Using a Mobile Device to Vary the Pace of Search", 5 pages.
Jones, Steve et al. "Using keyphrases as search result surrogates on small screen devices", Feb. 3, 2004, 14 pages.
Cai, Deng et al. "VIPS: a Vision-based Page Segmentation Algorithm", Nov. 1, 2003, 29 pages.
Wobbrock, Jacob et al. "WebThumb: Interaction Techniques for Small-Screen Browsers", 4 pages.
Teo, Lawrence et al. "Constraint-Based Document Layout for Mobile Computers", Jan. 26, 2001, 16 pages.
Schneiderman, "Tree Visualization with Tree Maps: 2-d Space-Filing Approach", ACM Transactions on Graphics, vol. 11, No. 1, Jan. 1992, pp. 92-99.
West et al., "A Web Browser for Small Terminals", ACM Symposium on User Interface Software Technology, 1999, pp. 187-196.

* cited by examiner

Fig. 9

CATEGORIZING PAGE BLOCK FUNCTIONALITY TO IMPROVE DOCUMENT LAYOUT FOR BROWSING

BACKGROUND

Many people search the web using small Internet devices such as handheld computers, phones, etc., when they are on the move. Though conventional search engines can be directly visited from mobile devices with web browsing capabilities, the information is not as conveniently accessible from a handheld device as it is from desktops. Existing information discovery mechanisms for searching the web are not well-suited to the relatively small display footprints associated with most mobile devices. One reason for this is because when screen size is reduced, as it is in most mobile computing devices, end-user searching efficiency drops.

For example, the small form factors of mobile devices make user interaction very inconvenient. Small devices usually do not have a keyboard or a mouse. It is therefore quite difficult to perform complex tasks, such as entering a long paragraph of text. Additionally, because of the small screen size, web browsing is like seeing a mountain in a distance from a telescope. In this scenario, a user must typically manually scroll the window to find the content of interest and position the window properly for reading information.

Additionally, mobile devices usually have limited processing power and often access the Internet over low-speed wireless networks (e.g. a General Packet Radio Service (GPRS) connection, etc.). In such scenarios, a mobile device may take a substantial amount of time to transmit and render a web page. Consequently, individuals may perform fewer searches using a mobile device, and review fewer search result pages on the mobile device, as compared to what would have been done using a full form factor computing device such as a desktop computer with a display.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, categorizing page block functionality to improve document layout for browsing is described. In one aspect, document content is analyzed with respect to multiple block function criteria. Results of this analysis are used to assign a respective block function to blocks of the document content. These block function assignments are used to generate one or more customized document layouts for browsing by a user.

BRIEF DESCRIPTION OF THE DRAWINGS

In the Figures, the left-most digit of a component reference number identifies the particular Figure ("Fig.") in which the component first appears.

DETAILED DESCRIPTION

Overview

Information needs are typically very different for mobile users as compared to desktop users. When a mobile device is used for information search and retrieval, a user will typically want to receive relevant answers/information to specific queries, rather than receive a large amount of content that would require close scrutinization and much display scrolling to identify relevant material. However, existing web page adaptation approaches to improve search result presentation do not provide an efficient way to indicate to an end-user those part(s) of a web page that are functionally distinct (e.g., more important) from other portions of the same web page. In contrast to such conventional approaches, the systems and methods for categorizing page block functionality to improve document layout for browsing do indicate to an end-user part(s) of a document that are more important as compared to other portions of the same web page based on categorized functionality of various page blocks.

Page block functionality includes, for example, information, navigation, interaction, advertisement, header, footer, other (i.e., not one of the previous functions), etc. A page block with information functionality includes informative content (e.g., text, images, etc.). A block with navigation functionality includes a control (e.g., a hyperlink) to guide a user to a different page. A block with interaction functionality includes an interface (e.g., a button, input box, form, etc.) for a user to communicate. A block with advertisement functionality includes an advertisement, for example, with little or no relationship to main content of the page. A block with header functionality includes a header such as a logo and/or title. A block with footer functionality represents a footer including, for example, copyright and/or contact information.

The systems and methods present search result information in one or more different document formats or presentations of differing levels of detail based on user specified explicit presentation hints. These presentations are designed to substantially reduce both the number of user interactions and the amount of time that an end-user may take to find information of interest within web search results. To theses ends, the systems and methods categorize web pages base on block functionality and/or importance values to different segments of a web page to extract and present substantially condensed search results to a mobile user in a presentation format selected by the user.

These and other aspects of the systems and methods for categorizing page block functionality to improve document layout for browsing are now described in greater detail.

An Exemplary System

Although not required, categorizing page block functionality to improve document layout for browsing is described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
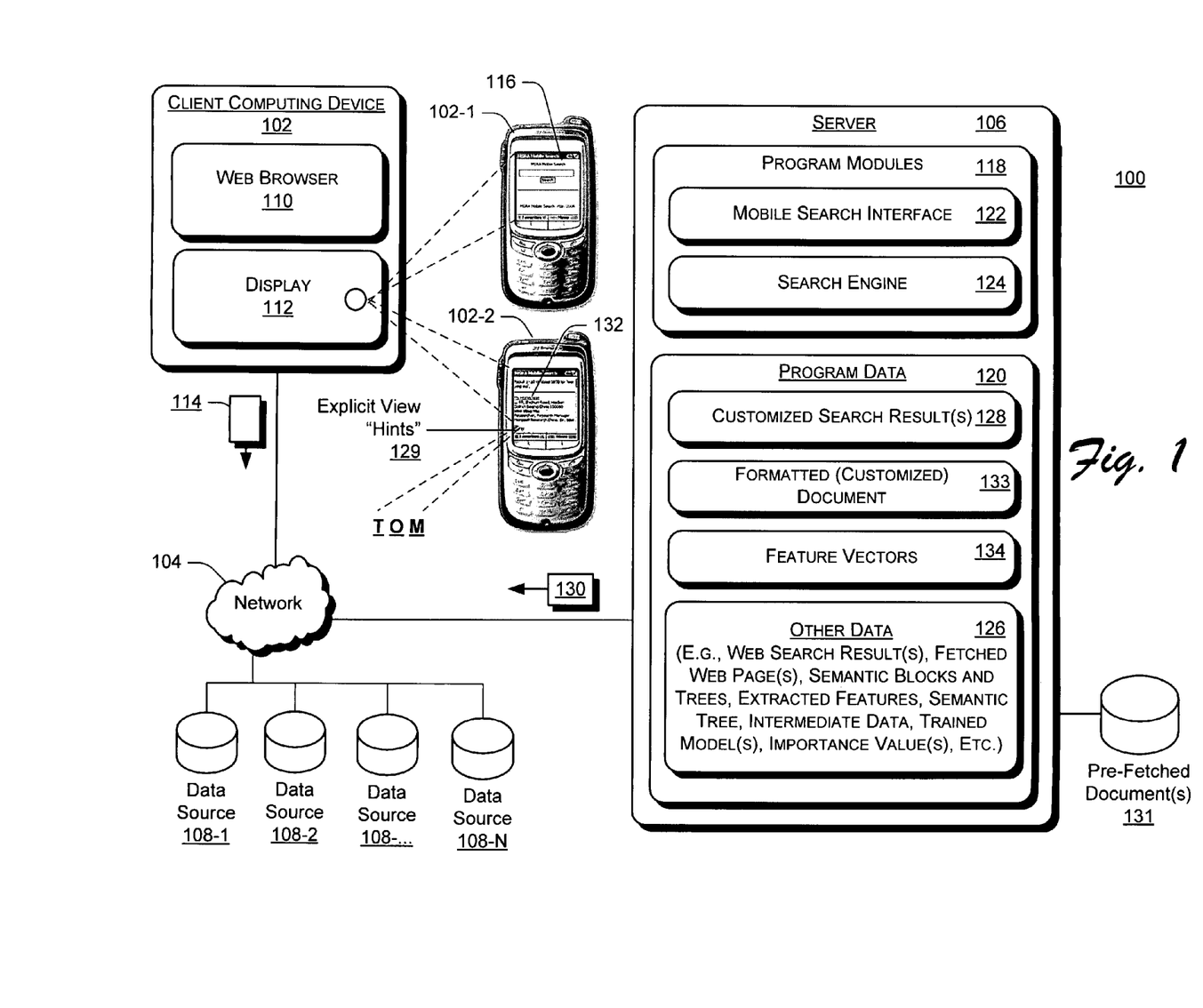
FIG. 1 illustrates a system for categorizing page block functionality to improve document layout for browsing, according to embodiment. In one implementation, the document browsing layout facilitates mobile device browsing of search results.

FIG. 1 shows an exemplary system 100 for categorizing page block functionality to improve document layout for browsing. In this implementation, system 100 includes client computing device 102 coupled across a communications network 104 to server 106, which in turn is coupled to any number of data repositories (sources) 108-1 through 108-N. Network 104 may include any combination of a local area network (LAN) and a general wide area network (WAN) communication environments, such as those which are commonplace in offices, enterprise-wide computer networks, intranets, and the Internet. Client computing device 102 is any type of computing device such as a small form factor computing device (e.g., a mobile computing device such as a mobile phone, personal digital assistant, handheld computer, etc.), personal computer, a laptop, a server, etc. Exemplary such client computing devices 102 are shown as mobile computing devices 102-1 and 102-2.

Client computing device 102 includes one or more program modules such as web browser 110. Web browser 110 presents a user interface on display 112 such as a small form factor LCD screen or other type of display. The user interface allows a user to format a query 114 from one or more keywords, select a search results for display, and indicate a particular customized document format in which the server 106 is to return the selected search result to the client computing device 102 for display. One aspect of an exemplary such user interface (UI) is shown as a simple start page 116. Start page 116 includes, for example, an input text control and a button control. The text input control allows the user to input one or more keywords to formulate query 114. Selection of the button control on UI 116 by the user causes the computing device 102 to send query 114 to server 106, and thereby trigger a keyword search process.

To this end, server 106 includes program modules 118 and program data 120. The program modules include, for example, mobile search interface 122 and search engine 124. In one implementation, the mobile search interface is implemented using ASP.NET. In this implementation search engine 124 is implemented on a same computing device as mobile search interface 122. In another implementation, search engine 124 is implemented on a different computing device than the mobile search interface 122. The search engine 124 can be any type of search engine such as a search engine deployed by MSN®, Google®, and/or so on.

Mobile search interface 122 receives query 114. Responsive to receiving the query 114, mobile search interface 122 communicates the query to search engine 124. Responsive to receipt of the query, search engine 124 searches or mines data source(s) 108 (108-1 through 108-N) for documents (e.g., web page(s)) associated with the keyword(s) to generate search results. For purposes of illustration, the search results are shown as a respective portion of "other data" 126. In this implementation, the search results are a ranked list of documents (e.g., web page(s)) that search engine 124 determined to be related or relevant to the keyword(s) of query 114.

Mobile search interface 122 modifies the search results to generate customized search results 128. To this end, mobile search interface 122 adds one or more explicit presentation hints 129 to the search results. Explicit presentation hint(s) 129 allow a user to direct mobile search interface 122 to present content of a selected document to the user in a particular layout. The layout will be substantially optimized for presentation on a small form factor display, such as display 112. More particularly, and in this implementation, explicit presentation hints 129 are presented with annotations allowing the user to specify: (a) a thumbnail ("T") view (with annotation) of the selected document; (b) an optimized ("O") one-column view of the selected document; and/or (c) a main content ("M") view of the selected document. These different explicit presentation layouts allow the user to identify how information associated with a document (e.g., web page) is to be presented to the user for browsing. This improves search efficiency for the user.

In this implementation, customized search results 128 include enough information to allow a user to evaluate the listed items, select a relevant link associated with a document of interest, and select an explicit presentation hint 129 for formatting the document of interest.

Mobile search interface 122 communicates customized search results 128 to client computing device 102 in a response 130. Responsive to receipt of response 130, browser 110 presents customized search results 128 to a user, for example, by displaying the ranked list with the explicit presentation hints 129 in a user interface. An exemplary presentation of the customized search results 128 with explicit presentation hints 129 is shown on client computing device 102-2 as user interface 132. Responsive to user selection of a link from the ranked list, web browser 110 packages the link and selected explicit presentation hint 129 into request 114 (component 114 represents both independent queries 114 and requests 114) for communication to server 106, and thereby, to mobile search interface 122.

We now describe more details of server 106 processing. In particular, responsive to receipt of request 114, if the document specified in the request has not already been retrieved by pre-fetch or crawling operations, mobile search interface 122 fetches the specified document from the associated data source 108. For purposes of illustration, fetched document(s) are shown as a respective portion of "other data" 126. Alternatively, if the particular document has already been retrieved, for example, as a result of server 102 crawling or pre-fetching operations, the particular document is retrieved from the pre-fetch location such as from a database 131 that stores pre-fetched (crawled) document(s) such as web page(s). Mobile search interface 122 adapts the fetched document's content as a function of the particular explicit presentation hint (T, O, or M) 129 selected by the user and block importance analysis of the content of the document.

To this end, mobile search interface 122 implements a vision-based page segmentation algorithm to partition the fetched web page into semantic blocks. Within a semantic block, the content is coherent in theme (e.g., an article in the center block) or plays a similar role (e.g., a navigation bar). Content of one semantic block is independent, less relevant, and/or plays a different role as compared to content of a different semantic block. Semantic blocks are shown as a respective portion of "other data" 126. In one implementation, mobile search interface 122 implements a known vision-based algorithm such as the one described in "VIPS: A vision-based page segmentation algorithm. Microsoft Technical Report", D. Cai, S. Yu, J. R. Wen, and W. Y. Ma., MSR-TR-2003-70, November 2003. VIPS makes full use of page layout features such as font, color and size.

Mobile search interface 122 first extracts all suitable nodes from an HTML DOM tree generated from the vision-based page segmentation. (HTML DOM is the document object model for HTML, which defines a standard set of objects for HTML, and a standard way to access and manipulate HTML objects). Separators between these nodes are then located. In this implementation, separators denote the horizontal or vertical lines in a fetched web page that visually do not cross any node. Based on these separators, a semantic tree of the web page is constructed. Mobile search interface 122 assigns a degree of coherence (DOC) value to each node in the tree to indicate a level of coherency for the node. Coherence represents consistency of content in a HTML node. For example, a coherency measurement indicates whether a node includes very different types of content (e.g., image, tables, and/or so on). A node with high coherency includes a greater amount of similar content as compared to a node of low coherency, which includes greater diversity of content. Mobile search interface 122 utilizes coherency measurement(s) to control the granularity of web page splitting or partitioning.

The semantic tree is shown as a respective portion of "other data" 126. Consequently, mobile search interface 122 efficiently groups related content into blocks of the semantic tree, while separating semantically different content blocks with respect to one another. Each node of the semantic tree corresponds to a respective feature vector.

Each semantic block includes some number of spatial features and some number of content features. TABLE 1 shows an exemplary set of spatial and content features.

TABLE 1

EXEMPLARY FEATURES FOR EXTRACTION AND BLOCK IMPORTANCE EVALUATION

| Feature class | Feature name | Description |
|---|---|---|
| absolute spatial features | BlockCenterX BlockCenterY BlockRectWidth BlockRectHeight | Coordinates of the center of a block Width and height of a block |
| relative spatial features | BlockCenterX/PageWidth BlockCenterY/PageHeight BlockRectWidth/PageWidth BlockRectHeight/PageHeight | Using the width and height of the whole page to normalize the absolute spatial features |
| window spatial features | BlockWindowRectHeight BlockWindowCenterY | Using a fixed-height window to normalize the absolute spatial features |
| content features | ImgNum ImgSize | Number and size of images contained in a block |
| | LinkNum LinkTextLength | Number of hyperlinks and anchor text length of a block |
| | InnerTextLength | Length of text between the start and end tags of HTML objects |
| | InteractionNum InteractionSize | Number and size of elements with <INPUT> and <SELECT> tags |
| | FormNum FormSize | Number and size of elements with the tag <FORM> |

For each semantic block, mobile search interface 122 extracts spatial features and content from the semantic block to construct a feature vector 134 for the semantic block. As shown in TABLE 1, and also as shown below in reference to TABLE 2, there are two types of features: spatial features and content features. Each type of feature is further divided into absolute features and relative features. Spatial features represent the spatial properties of each block like size and position, while content features characterize the content inside each block, such as the number, size or length of specific types of content, whether the content include some special keywords, or ratio of some features to other features. Relative features are dependent on other blocks in the same page, while absolute features are not.

TABLE 2 summarizes 108 features used in this particular implementation.

TABLE 2

EXEMPLARY FEATURES EXTRACTED FROM EACH PAGE (SYMANTEC) BLOCK

| Feature type | | Number | Description |
|---|---|---|---|
| Spatial | Absolute | 6 | Position and size of the block with respect to the entire page. |
| | Relative | 6 | Relative position and size of the block according to the page size (e.g., divided by the page size). |
| Content | Absolute | 48 | Number, size or length of specific types of content, such as text length, number of gif images, number of same-site links; Whether the content include some special keywords like "advertisement" or "copyright"; Ratio of some content features to other content features, for example, the ratio of the length of text with links to the total text length in the same block. |
| | Relative | 48 | Content features relative to other blocks in the same page. |

Based on these extracted features, server 106 implements one or more learning algorithms, such as those provided by a Support Vector Machine (SVM) with a Radical Basis Function (RBF) kernel. The learning algorithms are used to train a model used by mobile search interface 122 to analyze a document according to block functionality criteria identifying, for example, informative content, navigation content, interfacing content, advertisement content, or other content (not a previous type of content). As described below, mobile search interface 122 assigns functionality to respective semantic blocks of the web page based on this analysis. In this implementation, such preprocessing can be implemented using either the block function categorization scheme or an importance level categorization scheme. In another implementation, such preprocessing is implemented using a combination of these schemes. For example, in a category, blocks can be sorted by importance.

TABLE 3 shows exemplary semantic block functions, according to one embodiment.

TABLE 3

EXEMPLARY SEMANTIC BLOCK FUNCTIONS

| Function | Description |
|---|---|
| Information | Blocks with some informative content, usually in text and images, like news. |
| Navigation | Blocks with hyperlinks to guide users to other pages, either within the same site or outside the site. |

TABLE 3-continued

EXEMPLARY SEMANTIC BLOCK FUNCTIONS

| Function | Description |
| --- | --- |
| Interaction | Blocks with interfaces for users to communicate with the system, such as button, input box or form. |
| Advertisement | Blocks with advertisements and have little relationships with the main content. |
| Header | Header of the page, usually includes logo and title. |
| Footer | Footer of the page, usually includes copyright and contact information. |
| Others | Blocks that can not be classified into any of the above categories, such as decoration tags. |

With respect to content importance levels, in one implementation, mobile search interface 122 recognizes a number of different content importance levels during document block importance analysis operations. Such operations determine whether blocks of content of a document are classified or divided into three independent importance levels, as shown in TABLE 4.

TABLE 4

EXEMPLARY BLOCK IMPORTANCE LEVELS

| Level | Description |
| --- | --- |
| 3 | The most prominent part of a page, such as headlines, main content, etc. |
| 2 | Useful information, but not very relevant to the topic of a page, such as navigation, directory, etc.; or relevant information to the theme of a page, but not with prominent importance, such as related topics, topic index, etc. |
| 1 | Noisy information such as ads, copyright, decoration, etc. |

The block importance model implemented by one implementation of mobile search interface 122 is defined as a function to map features to importance of a page block, and is formalized as: <block features>→block importance (1). After splitting a web page P and calculating the importance for each page segment, mobile search interface 122 is left with a set of semantic blocks Bi and corresponding importance values IMPi: P={(Bi, IMPi)} (2). To fit the formatted document 133 into small screens, one or more different approaches are adopted.

Figure 2:
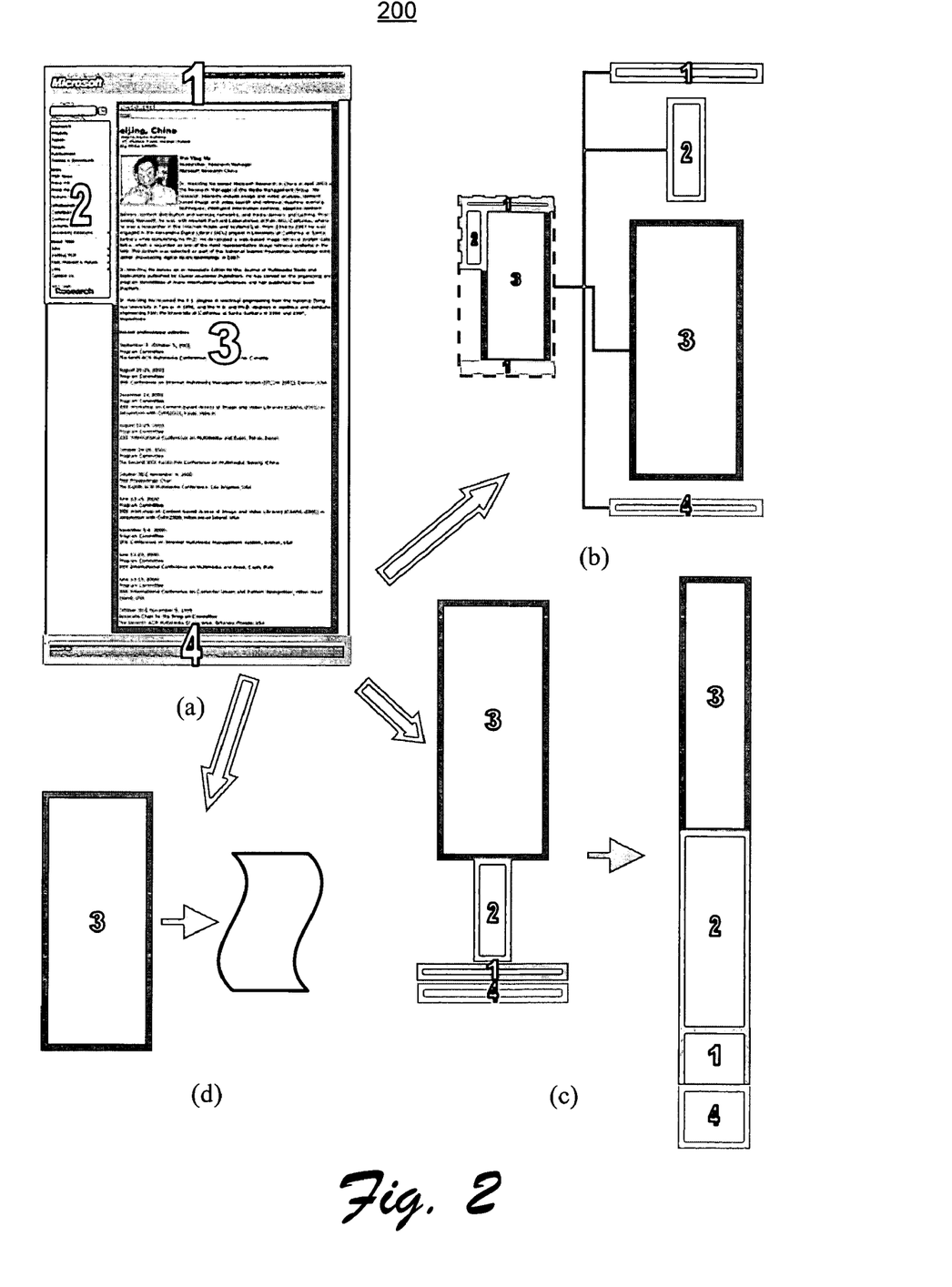
FIG. 2 shows exemplary document layouts including, for example, thumbnail, optimized single column, and main content views, according to one embodiment.
Figure 3:
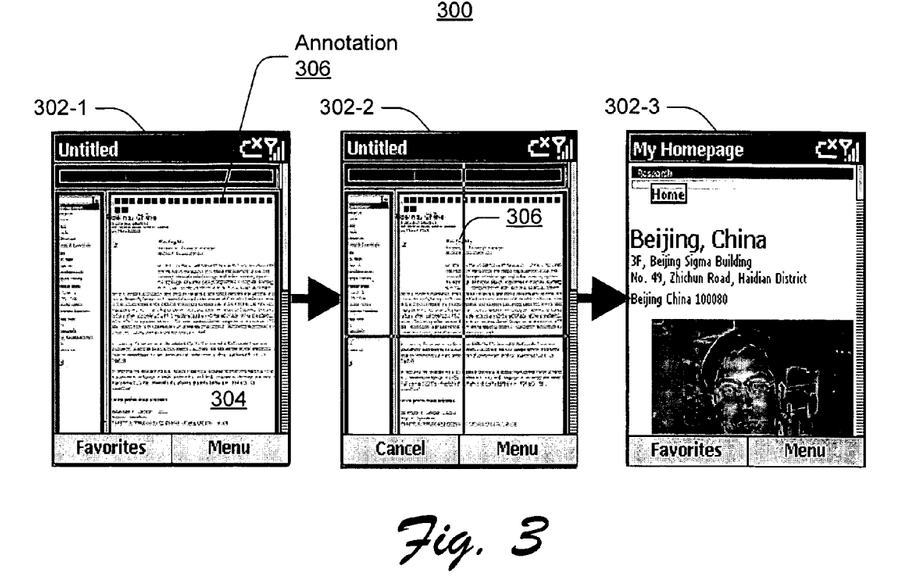
FIG. 3 shows an exemplary thumbnail view document format, with annotation, block selection aspects, and content browsing of a selected, according to one embodiment.

FIGS. 2 and 3 show exemplary aspects of fetched web page (document) block function categorization results, presentation views, and block selection. Aspects of FIGS. 2 and 3 are described with respect to components of FIG. 1. Whenever an aspect or component from FIG. 1, 2, or 3 is indicated, the left-most digit of the component's reference number identifies the particular figure in which the component first appears. Referring to FIG. 2, portion (a) shows formatted document 133 segmented into three (3) respective semantic blocks: segment 1, segment 2, and segment 3 (not necessarily listed in order of importance). In this implementation: segment 1 shows page blocks with header functionality; segment 2 shows page blocks with navigation functionality; segment 3 shows page blocks with information functionality; and segment 4 shows page blocks with footer functionality. Other block function presentations can also be displayed to show other types of block functionality as desired.

Exemplary Thumbnail View with Annotation(s)

Portion (b) of FIG. 2 represents a thumbnail view corresponding to a user selected explicit presentation hint of "T" from the ranked list of search results described above. The thumbnail view of the original web page is presented to users to give a global view and an index to a set of sub-pages containing the information of different segments—original fetched web page layout is preserved. To generate this view, mobile search interface 122 down sub-samples the fetched web page (document) to generate a thumbnail (formatted document 133) to fit the screen width of display 112, while preserving the page's original two-dimensional layout. In this implementation, when a user selects any portion of the thumbnail associated with a particular importance level, the user may browse the content of that function block independently of content from any other function block. In this implementation, corresponding block functionality indication(s) are annotated on the thumbnail to assist the user to quickly locate relevant content. These aspects are now described with reference to FIG. 3.

FIG. 3 shows an exemplary thumbnail view 300 with annotation (302-1), block selection aspects (302-2), and content browsing of a selected block (302-3). Referring to windows 302-1 through 302-3, respective function values associated with respective ones of different blocks in the web page 102 are marked on the thumbnail using rectangles of different colors (specific colors are not shown in this figure), such as red (302-1 and 302-2), green (302-3), and blue to respectively represent blocks of differing categorized function (or importance in another implementation). In one implementation, the number of occurrences of keyword(s) in a query 114 in each block is annotated with small squares.

In one implementation, a user utilizes a stylus or logical or physical direction buttons to select an appropriate tile (semantic block) for browsing, as shown with selection crosshair 306. Browser 110 presents content of a selected block to the user as shown in 302-3.

Exemplary Optimized One-Column View

To avoid horizontal scrolling, many commercial web browsers re-format a web page into a single column to make the page fit the screen width of a small form factor display. While one-column views can facilitate the reading process, conventional techniques to generate such a view typically result in the user having to perform a large amount of vertical scrolling. For example, to access main content using such a view for many web pages, the user is required to scroll past the entire content of the title, advertisements and navigation bar.

This limitation of conventional systems is addressed by the optimized view provided by system 100 (FIG. 1). When a user clicks on a link labeled by "O" (e.g., see FIG. 1, Explicit presentation hints 129), the optimized one-column view (formatted document 133) is generated by mobile search interface 122. In one implementation, mobile search interface 122 first sorts the blocks for presentation according to their function(s), using a default ordering. An exemplary default ordering, for example, includes navigation, interaction, header, footer, advertisement, others, and/or so on. In another implementation, a user defines a custom ordering of the functional categories.

Figure 4:
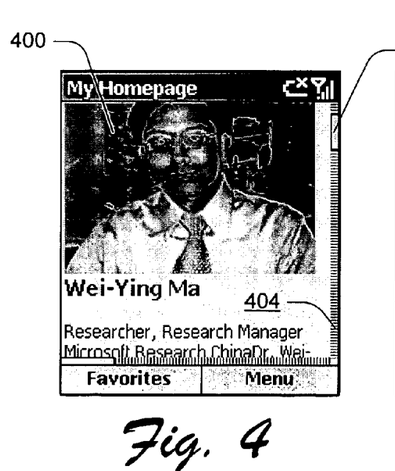
FIG. 4 shows an exemplary optimized view document layout, according to one embodiment.
Figure 5:
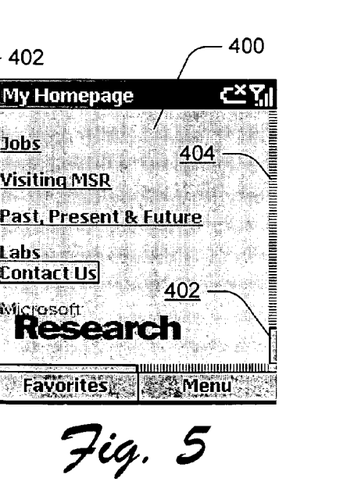
FIG. 5 shows an exemplary optimized view document layout, according to one embodiment.

Mobile search interface 122, subsequent to sorting of page blocks, transforms the page to a one-column view. The one-column view is then communicated to browser 110 for display to the user in a linear pattern. Portion (c) of FIG. 2 shows an exemplary such optimized one-column view with page blocks being sorted either with respect to function categories. As shown in FIGS. 4 and 5 respectively, search results most relevant to the query 114 have been placed at the beginning of the page, whereas irrelevant information is placed at the end of page, according to one embodiment. More particularly, FIG. 4 shows an optimized view 400 of a formatted document, wherein block(s) of content associated with one or more predetermined categories (e.g., header or information function block(s)) are located at the top of the web page (as indicated by the top position of thumb-scroll 402 in scroll-bar 404. FIG. 5 shows an optimized view 400 of a formatted document, wherein block(s) of content associated with one or more different predetermined categories (e.g., footer function block(s)) are located at the bottom of the web page (as indicated by the lower position of thumb-scroll 402 in scroll-bar 404. Using such an optimized web page layout, a user can search the presented content for efficiently for relevant information.

In one implementation, to avoid deleting original web page layout data that could make some content unreadable, such as maps or timetables, the mobile search interface 122 detects and preserves information associated with the original layout of web page content objects.

Exemplary Main Content View

Figure 6:
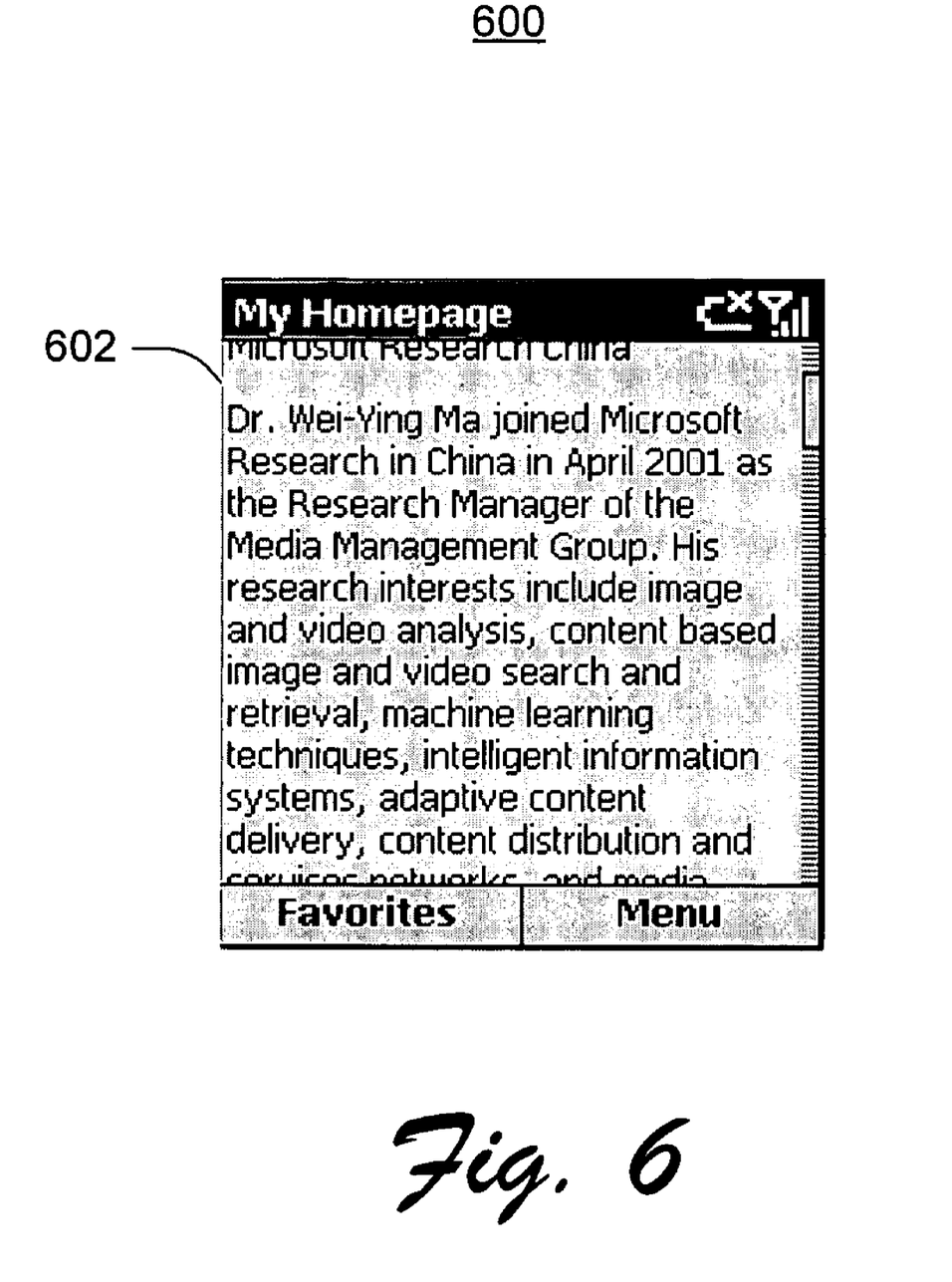
FIG. 6 shows an exemplary main content presentation of a formatted document, according to one embodiment.

FIG. 6 shows exemplary main content of a formatted document presented in a window 600, wherein only main content of the document (web page) is presented to a user. In the main content view, mobile search interface 122 extracts text from fetched web page block(s) that have been categorized according to function to generate formatted document (e.g., formatted web pages) 133. Only this main content is displayed to a user as shown in portion (d) of FIG. 2 and FIG. 6. When blocks are sorted with respect to function, the formatted document 133 shows material with functionality determined (e.g., according to a function importance ordering) to be of highest importance. To this end, mobile search interface 122 generates formatted document 133 according to the user selected explicit presentation hint of "Main", or "M".

Exemplary Comparison of the Three Presentation Schemes

TABLE 5 shows an exemplary comparison of the thumbnail, optimized on-column view, and main content presentation schemes.

TABLE 5

EXEMPLARY COMPARISON OF PRESENTATION SCHEMES

| | Number of interactions | Downloading/ rendering time | Information preserving |
|---|---|---|---|
| Thumbnail view with annotation | +++ | +++ | +++ |
| Optimized one-column view | ++ | ++ | ++ |
| Main content view | + | + | + |

Exemplary Procedures

Figure 7:
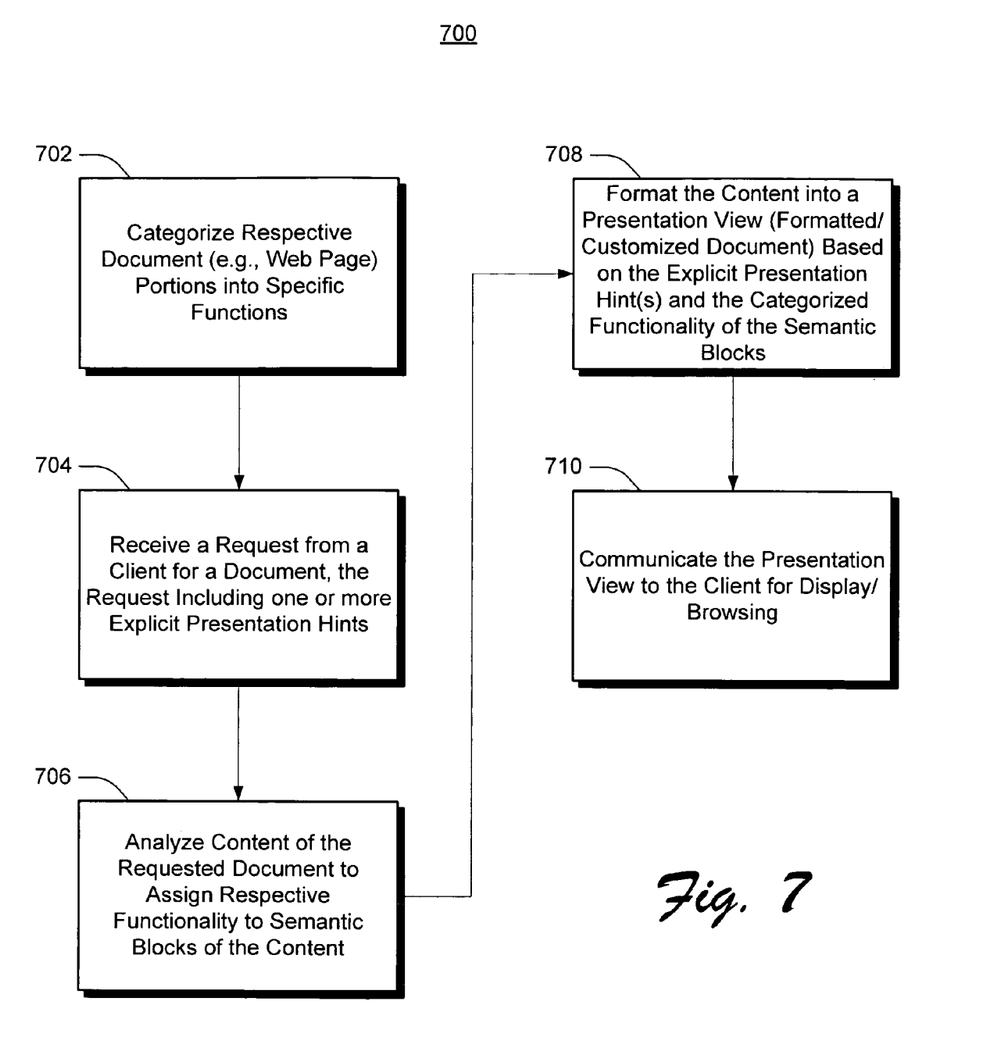
FIG. 7 shows an exemplary computer-implemented procedure to categorize block content according to function and improve a document layout for substantially optimized browsing on a small form factor display, according to one embodiment.

FIG. 7 shows an exemplary procedure 700 for categorizing page block functionality to improve document layout for browsing. In one implementation, this procedure formats a document layout to browse search results on a small form factor device such as a mobile device. The operations of this procedure are described with respect to aspects of FIG. 1. The left-most digit of a component reference number identifies the particular figure in which the component first appears. At block 702, mobile search interface 122 (FIG. 1) categorizes portions of the document with respect to specific block functionality. Examples of such block functionality are shown above with respect to TABLE 3.

At block 704, mobile search interface 122 receives a request 114 from a client 102 for a document such as a web page. In this implementation, the document was selected by a user of the client computing device 102 from a customized set of search results 128 such as a ranked list of links associated with one or more keywords in a query 114 (i.e., the query was submitted to search engine 124 in a previous session). The request also includes one or more explicit presentation hints 129 indicating how the user would like to see content from the selected document formatted by server 106 before it is returned to the client computing device for presentation. In this implementation, the explicit presentation hint 129 indicates that the user would like to receive the content associated with the document of interest in a thumbnail ("T"), optimized one-column ("O"), or main content ("M") view the content of each view being determined by analyzing block functionality of the associated document's content.

At block 706, mobile search interface 122 analyzes content of the requested (or crawled) document to assign different categorized functionality (e.g., information, navigation, interaction, advertisement, header, footer, other—not one of the previous functions, etc.) to respective semantic blocks of the document). In one implementation, the operations of block 702 are performed in demand responsive to receipt of a request 114 from a client computing device 102. In another implementation, the particular document was pre-fetched, for example, as a result of web crawling operations.

At block 708, mobile search interface 122 formats the analyzed content (e.g., see other data 126 of FIG. 1) into a formatted/customized document 133 based on the received explicit presentation hints 129 (please see block 704). (A customized document may be generated upon demand or generated in advance of a request for the particular document and document format). At block 710, mobile search interface 122 communicates the formatted document 133 in the requested presentation layout (via hint 129) to the requesting client 102 for display and browsing.

Figure 8:
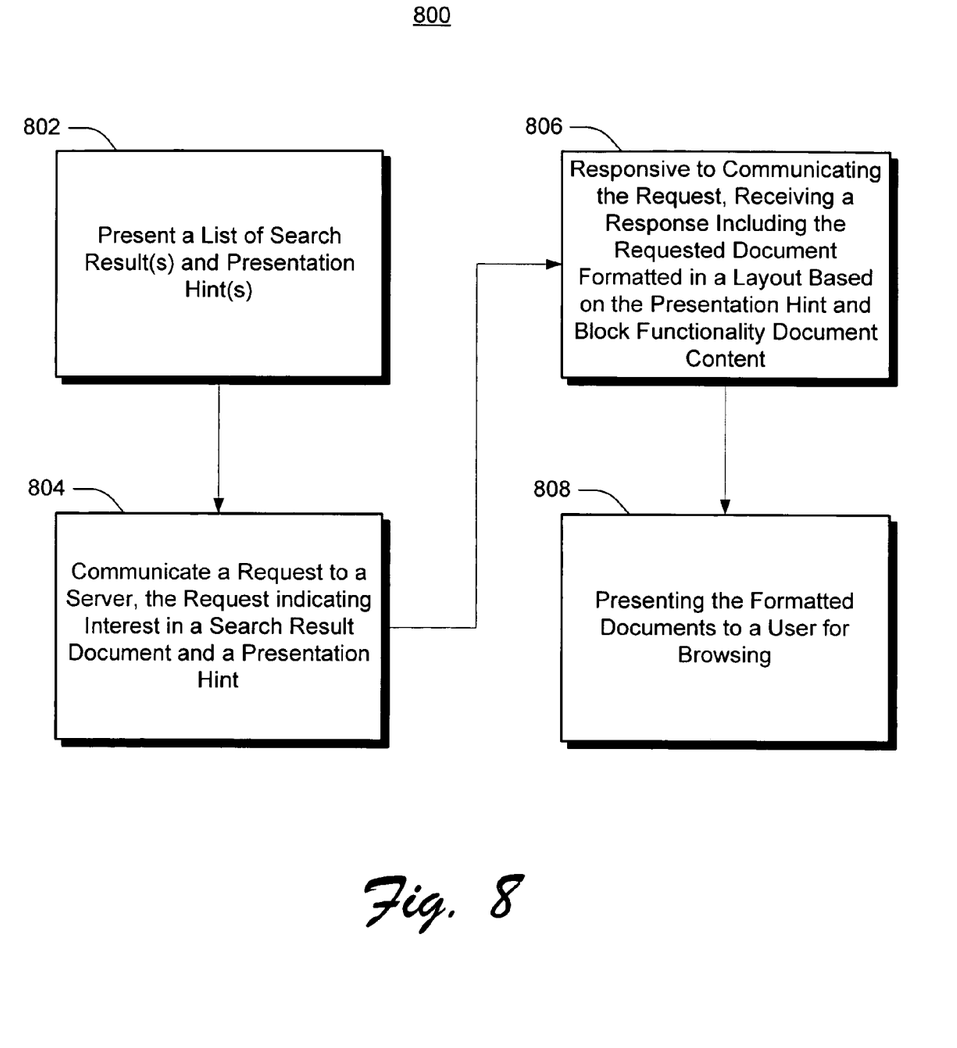
FIG. 8 shows an exemplary procedure for a client device to request, receive, and present a document formatted according to categorized content functionality and a selected presentation hint, according to one embodiment.

FIG. 8 shows an exemplary procedure 800 for a client computing device to request, receive, and present a document formatted using categorized content functionality and a selected presentation hint. The operations of this procedure are described with respect to FIG. 1. (The left-most digit of a component reference number identifies the particular figure in which the component first appears). At block 802, an application such as a browser 110 executing on the client computing device 102 presents customized search results 128 and presentation hints 129 to a user. The customized search results 128 were communicated to the client by server 106 responsive to receipt of a search query 114 from the client to the server 106. The query 114 specified one or more keywords. The server, responsive to receipt of the search query, generated the customized search results 128 from search results corresponding to the query 114. The customized search results 128 included the explicit presentation hints 129 for formatting (by server 106) a document identified in the search results using categorized block functionality.

At block 804, the client 102 communicates a request 114 to the server 106. The request indicates user interest in a search result document (i.e., a document that the user has selected from the search results 128). The request also includes a user selected one of the explicit presentation hints 129. The selected presentation hint indicates how the user would like mobile search interface 122 to format the document before returning it to the client computing device 102 for subsequent presentation. At block 806, and responsive to the request, the client receives a response 130 from the mobile search interface 122. The response includes a formatted document 133 corresponding to the requested document (please see block 804). The formatted document has a layout based on: (1) categorized functionality of blocks of associated content in the requested document; and (2) the provided presentation hint 129. In this implementation, server 106 communicated the formatted document 133 to the client 102 responsive to receipt of the request 114. The formatted document may have been generated responsive to receipt of the request, or independent of the request (e.g., responsive to crawling operations performed by server 106).

At block 808, client 102 presents the formatted document 133 to a user for browsing. As described above, layout of the formatted document corresponds to the presentation hint 129 supplied by the user (please see block 804). Exemplary layouts are shown in FIG. 2.

An Exemplary Operating Environment

Figure 9:
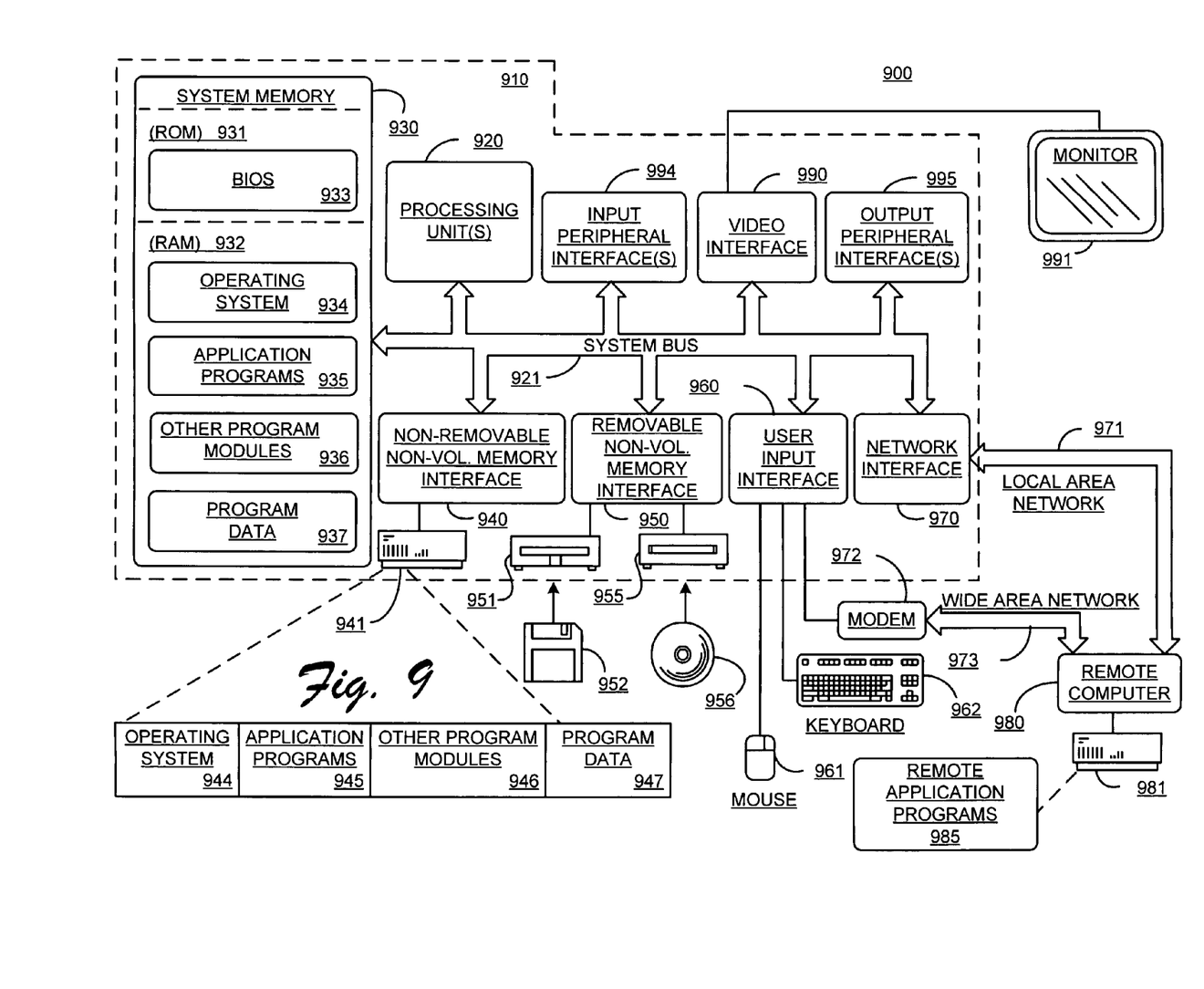
FIG. 9 shows an example of a suitable computing environment in which systems and methods to categorize page block functionality for improved document presentation on a small form factor device may be fully or partially implemented, according to one embodiment.

FIG. 9 illustrates an example of a suitable computing environment in which categorizing page block functionality to improve document layout for browsing may be fully or partially implemented. Exemplary computing environment 900 is only one example of a suitable computing environment for the exemplary system 100 of FIG. 1, and is not intended to suggest any limitation as to the scope of use or functionality of systems and methods the described herein. Neither should computing environment 900 be interpreted as having any dependency or requirement relating to any one or combination of components illustrated in computing environment 900.

The methods and systems described herein are operational with numerous other general purpose or special purpose computing system, environments or configurations. Examples of well-known computing systems, environments, and/or configurations that may be suitable for use include, but are not limited to mobile computing devices, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a networked computing environment where tasks are performed by remote processing devices that are linked through a communications network.

With reference to FIG. 9, an exemplary system providing categorizing page block functionality to improve document layout for browsing architecture includes a general-purpose computing device in the form of a computer 910 implementing, for example, server operations associated with server 106 of FIG. 1. Components of computer 910 may include, but are not limited to, processing unit(s) 918, a system memory 930, and a system bus 921 that couples various system components including the system memory to the processing unit 918. The system bus 921 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 910 typically includes a variety of computer-readable media. Computer-readable media can be any available media that can be accessed by computer 910, including both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 918. By way of example and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that they are at least different copies.

When computing device 910 is performing server 106 functionality, a user may enter commands and information into the computer 910 through input devices such as a keyboard 962 and pointing device 961, commonly referred to as a mouse, trackball or touch pad. Other input devices (not shown) may include a microphone, joystick, graphics pen and pad, satellite dish, scanner, etc. These and other input devices are often connected to the processing unit 918 through a user input interface 960 that is coupled to the system bus 921, but may be connected by other interface and bus structures, such as a parallel port, game port or a universal serial bus (USB). In this implementation, a monitor 991 or other type of user interface device is also connected to the system bus 921 via an interface, for example, such as a video interface 990.

The computer 910 operates in a networked environment using logical connections to one or more remote computers, such as a remote computer 980. In one implementation, remote computer 980 represents a mobile client computing device 102 of FIG. 1. The remote computer 980 may be a mobile computing device (e.g., a small form factor device) such as a mobile phone, a personal computer, a server, a router, a network PC, a peer device or other common network node, and as a function of its particular implementation, may include many or all of the elements described above relative to the computer 910, although only a memory storage device 981 has been illustrated in FIG. 9. The logical connections depicted in FIG. 9 include a local area network (LAN) 981 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example and not limitation, FIG. 9 illustrates remote application programs 985 as residing on memory device 981. The network connections shown are exemplary and other means of establishing a communications link between the computers may be used.

CONCLUSION

Although categorizing page block functionality to improve document layout for browsing has been described in language specific to structural features and/or methodological operations or actions, it is understood that the implementations defined in the appended claims are not necessarily limited to the specific features or actions described.

For example, mobile search interface 122 has been described in association with search engine 124, wherein mobile search interface 122 modifies search results to generate customized search results 128. This modification includes insertion of one or more explicit presentation hints 129 into the search results. In another implementation, mobile search interface 122 is not associated with a search engine 124 and does not modify search results with the explicit presentation hints. Rather, component 122 can modify any type of document list, independent of whether the document list represents query search results, with the explicit presentation hints 129 for communication to a client. In this alternate implementation, and analogously to what was already described, a user selects a document reference and a presentation hint for communication in a request 114 to component 122. Responsive to receipt of this request, component 122 generates a formatted document 133 based on: (1) analysis of categorized block functionality associated with the selected document; and (2) the selected presentation hint. Component 122 then communicates this formatted document to the client for display to the user and subsequent browsing by the user.

Accordingly, the specific features and operations are disclosed as exemplary forms of implementing the claimed subject matter.

The invention claimed is:

1. A computer-implemented method comprising:
analyzing, using multiple block function criteria, content of a document;
assigning, based on the analyzing, a respective block function of multiple block functions to semantic blocks of the content; and
generating one or more customized documents for browsing by a user, each customized document having a respective layout based on block function(s) assigned to respective ones of the semantic blocks, wherein the analyzing comprises:
partitioning the document into multiple semantic blocks;
for each semantic block of the semantic blocks, extracting spatial features and content features;
for each semantic block of the semantic blocks, generating a respective feature vector from respective spatial and content features;
creating a semantic tree of the document from respective feature vectors generated from the semantic blocks, the semantic tree grouping related content in respective blocks of the multiple semantic blocks; and
assigning a respective degree of coherence to node(s) of the semantic tree.

2. The method of claim 1, wherein the document is a web page.

3. The method of claim 1, wherein the block function criteria identify block functions comprising one or more of information, navigation, interaction, advertisement, header, footer, and other.

4. The method of claim 1, wherein assigning further comprises training a model to map block features to respective ones of the multiple block functions.

5. The method of claim 1, wherein the spatial or content features comprise a location, a personal profile, a time of day, a schedule, or a browsing history.

6. The method of claim 1, wherein the partitioning is implemented using a page segmentation algorithm.

7. The method of claim 1, wherein generating the one or more customized documents further comprises configuring, based on assigned block functions of the semantic blocks, layout of the one or more customized documents.

8. A method as recited in claim 1, wherein generating the one or more customized documents further comprises configuring layout of the one or more customized documents to generate a thumbnail view, an optimized one-column view, or a main content view for each of the one or more customized documents.

9. The method of claim 1, further comprising:
   assigning a respective importance value to the block function; and
   configuring layout of a document of the one or more customized documents based on the respective importance value.

10. The method of claim 1, further comprising receiving a request from a client computing device to fetch the document, the document being associated with search results comprising one or more explicit document presentation hints for selection by the user.

11. The method of claim 1, further comprising:
   receiving search results from a search engine, the search results comprising a link associated with the document; and
   annotating the search results with one or more explicit presentation hints for selection by the user to indicate a particular format of multiple formats, each format indicating a respective page layout for the one or more customized documents, portion(s) of the content for use or exclusion with respect to the respective layout as a function block importance level(s) associated with the portion(s).

12. A computer-readable storage medium including computer-program instructions that, when executed by a processor, perform acts comprising:
   analyzing, using multiple block function criteria, content of a document, the block function criteria to indicate one or more block functions pertaining to information, navigation, interaction, advertisement, header, and footer;
   assigning, based on the analyzing, a respective block function of multiple block functions to semantic blocks of the content; and
   generating one or more customized documents for browsing by a user according to respective presentation mode(s) selected from a plurality of presentation modes by the user, wherein the one or more customized documents being generated from semantic block(s) of the content using respective assigned block function(s), and wherein the plurality of presentation modes comprise a thumbnail view, an optimized one-column view, and a main content view.

13. The computer-readable storage medium of claim 12, wherein the assigning further comprises training a model to map block features to respective ones of the multiple block functions.

14. The computer-readable storage medium of claim 12, wherein the analyzing further comprises partitioning the document into multiple semantic blocks;
   for each semantic block of the semantic blocks, extracting spatial features and content features;
   for each semantic block of the semantic blocks, generating a respective feature vector from respective spatial and content features;
   creating a semantic tree of the document from respective feature vectors generated from the semantic blocks, the semantic tree grouping related content in respective blocks of the multiple semantic blocks; and
   assigning a respective degree of coherence to node(s) of the semantic tree.

15. The computer-readable storage medium of claim 13, wherein the partitioning is implemented using a vision-based page segmentation algorithm.

16. The computer-readable medium of claim 12, wherein the computer-program instructions further comprise instructions for:
   receiving search results from a search engine, the search results comprising a link associated with the document; and
   annotating the search results with one or more explicit presentation hints for selection by the user to indicate a particular format of multiple formats, each format indicating a respective page layout for the one or more customized documents, portion(s) of the content for use or exclusion with respect to the respective layout as a function block importance level(s) associated with the portion(s).

17. A computing device comprising:
   a processor; and
   a memory comprising computer-program instructions that, when executed by the processor, perform acts comprising:
      partitioning a document into multiple semantic blocks;
      for each semantic block of the semantic blocks, extracting spatial features and content features; and
      assigning, based on extracted spatial and content features, a respective block function of multiple block functions to respective ones of the semantic blocks, wherein the assigning is determined based on a learning model mapping the extracted spatial and content features to the respective block function of multiple block functions.

18. The computing device of claim 17, further comprising:
   generating a customized document with a layout based on which of the multiple block functions have been assigned to respective ones of the semantic blocks.

* * * * *